United States Patent [19]
Fujii et al.

[11] 3,900,658
[45] Aug. 19, 1975

[54] POLYFLUOROCARBON ARTICLE AND METHOD FOR MAKING THE SAME

[75] Inventors: Tuneo Fujii, Suita; Yukiharu Nakamura, Ibaraki, both of Japan

[73] Assignee: Daikin Kogyo Co., Ltd., Osaka, Japan

[22] Filed: July 12, 1973

[21] Appl. No.: 378,500

Related U.S. Application Data

[63] Continuation of Ser. No. 117,021, Feb. 19, 1971, abandoned.

[30] Foreign Application Priority Data
Feb. 21, 1970 Japan.................. 45-15121

[52] U.S. Cl................................ 428/220; 428/422
[51] Int. Cl........................ B32b 31/24; B32b 27/06
[58] Field of Search .......... 117/49, 160 R, 161 UZ, 117/138.8 UF, 87, 205, 206, 219, 221–223; 161/189, 225

[56] References Cited
UNITED STATES PATENTS

| | | | |
|---|---|---|---|
| 2,647,079 | 7/1953 | Burnham | 204/38 |
| 2,789,063 | 4/1957 | Purvis et al. | 117/48 X |
| 3,218,255 | 11/1965 | Pratt | 161/189 X |
| 3,243,321 | 3/1966 | Rowand | 117/49 X |
| 3,419,414 | 12/1968 | Marks | 117/49 X |
| 3,505,167 | 4/1970 | Smarook | 161/189 |
| 3,551,264 | 12/1970 | Mulay | 161/189 X |
| 3,558,582 | 1/1971 | Bacskai | 161/189 X |
| 3,563,785 | 2/1971 | Toshisaburo et al. | 161/189 X |
| 3,592,700 | 7/1971 | Toy | 117/49 X |

*Primary Examiner*—Harold Ansher
*Attorney, Agent, or Firm*—Stevens, Davis, Miller & Mosher

[57] ABSTRACT

A polyfluorocarbon film or sheet which has adhering ability onto self-supporting materials by the use of conventional adhesives is produced by subjecting a metal surface to chemical metallization to form a chemically metallizing layer, coating a polyfluorocarbon coating composition on the layer, drying, sintering and then peeling off the produced film or sheet having the layer on one side from the metal surface.

3 Claims, 4 Drawing Figures

POLYFLUOROCARBON ARTICLE AND METHOD FOR MAKING THE SAME

This is a continuation of application Ser. No. 117,021, filed Feb. 19, 1971, and now abandoned.

The present invention relates to a polyfluorocarbon article and a method for making same, and particularly to a polyfluorocarbon film or sheet which can be adhered to self-supporting materials by using a conventional adhesive and a method for making the same.

Hitherto, a polyfluorocarbon article such as film or sheet has been used as a useful synthetic resin article, because of its excellent heat-resistance, inertness to chemical attack, low coefficient of friction, non-adherence and electrical characteristics. Although the polyfluorocarbon articles has excellent properties as described above, the use of the same is restricted due to the article's non-adherence, that is, there is no suitable adhesive for adhering the polyfluorocarbon article to self-supporting materials due to its extremely poor affinity for adhesives.

For the purpose of increasing the adhering ability of polyfluorocarbon film onto self-supporting materials by the use of adhesive (hereinafter referred to as "adhesiveness"), there has been proposed a method for improving the adhesiveness onto self-supporting materials by treating a polyfluorocarbon film with a solution of alkali metal complex. However, the proposed method creates some disadvantages in that dangerous metallic sodium must be employed; the operation is complicated; in case of contacting with water during the operation the adhesiveness is lost, and therefore humidity control is necessary.

An object of the present invention is to provide a novel polyfluorocarbon article.

A further object of the invention is to provide a film or sheet of polyfluorocarbon such as polytetrafluoroethylene or tetrafluoroethylene-hexafluoropropylene copolymer which has excellent adhesiveness by the use of a conventional adhesive onto a self-supporting material.

A further object of the invention is to provide a method for making a polyfluorocarbon film or sheet having excellent adhesiveness.

A still further object of the invention is to provide a method for making an extremely thin film of polyfluorocarbon having excellent adhesiveness, which has never been achieved in the case of conventional methods.

These and other objects of the invention will be apparent from the following description and Claims.

It has now been found that the above objects can be attained by subjecting a metal surface to chemical metallization to form a chemically metallizing layer, coating a polyfluorocarbon coating composition on the chemically metallizing layer, drying, sintering the resultant assembly at 280° to 420°C. and then peeling off the produced polyfluorocarbon film or sheet (hereinafter referred to as "film") having a chemically metallizing layer on one side from the metal surface.

Thus obtained polyfluorocarbon film which tightly bonds to the chemically metallizing layer can be readily adhered onto various self-supporting materials such as metal, glass, earthen ware, wood, rubber, plastic, fiber and paper by using commercially available adhesives.

According to the method of the present invention there is no trouble as in the said method using the solution of metallic sodium complex. Besides, the polyfluorocarbon film can be adhered onto a self-supporting material such as wood, rubber, plastic, fiber or paper on which polyfluorocarbon coatings hitherto have never been carried out because the sintering at a high temperature is required. Accordingly, the present invention can give substantially the same effects as those in the case of coating polyfluorocarbon onto a self-supporting material.

An easy and improved adhesiveness to polyfluorocarbon film has been attained by the present invention.

The polyfluorocarbon film of the present invention not only exhibits an excellent adhesiveness but also may optionally be prepared as a thin film of a thickness of 5 to 100 $\mu$. Besides, according to the present invention a uniform thickness of the polyfluorocarbon film can be obtained, even in the case of extremely thin film, pin-holes are hardly produced, and accordingly the insulation can be completely guaranteed. The polyfluorocarbon has a smooth surface and an excellent sliding property, and is tough and of soft touch, and is hardly wrinkled. And, there is not lost excellent heat-resistance, inertness to chemical attack, low coefficient of friction, non-adherence and electrical characteristics which polyfluorocarbon has originally.

Figure 1:
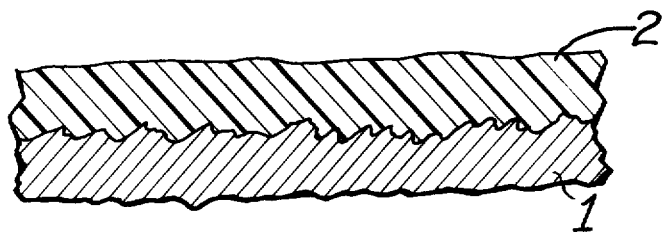
FIG. 1 is a partially magnified cross-sectional view for illustrating the structure of polyfluorocarbon film of the present invention.

As described above, the said excellent effects can be attained by tightly bonding a chemically metallizing layer 1 onto one side of polyfluorocarbon film 2 as understood from FIG. 1. Such polyfluorocarbon film having the chemically metallizing layer on one side is a novel film and hitherto has never been described in any literature.

Figure 2:
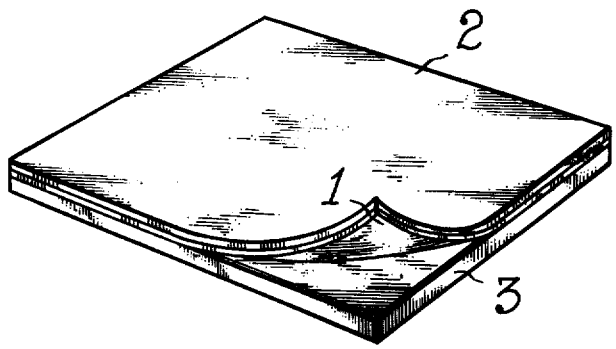
FIG. 2 is a sketch view for illustrating the appearance of the film which is peeled off from the metal plate.

The novel polyfluorocarbon film is produced by subjecting a metal surface 3 to chemical metallization to form a chemically metallizing layer 1, coating a polyfluorocarbon coating composition such as an enamel or dispersion on the chemically metallizing layer, drying, sintering the resultant assembly at 280° to 420°C. and then peeling off the produced polyfluorocarbon film 2 having a chemically metallizing layer 1 onto one side from the metal surface 3 as shown in FIG. 2. As the metal surface, there may be usually utilized that of a metal plate having a smooth surface. All surface metals on which a chemically metallizing layer is produced can be employed even if they have an uneven or spherical surface, and depending upon each surface appearance there is obtained a polyfluorocarbon film having the corresponding shape. Not only a metal plate, but also a metallic mold, having various shapes, can be employed. As kinds of such a metal there may be employed iron, stainless steel, aluminum, copper, and others, onto which the chemically metallizing layer can be produced and which can bear the sintering temperature of polyfluorocarbon at 280° to 420°C.

The "chemically metallizing layer" is a layer formed by subjecting a metal surface to chemical metallization, and is a water-insoluble and crystalline one mainly consisting of metal salt and/or oxide.

As a method for forming the chemically metallizing layer onto the metal surface, there may be employed any conventional means for the chemical metallization which hitherto has been often carried out for rust-preventing or paint-holding.

For example, a chemically metallizing liquid is sprayed or coated onto a metal surface, or the latter is dipped in the former. Typical chemically metallizing liquids are aqueous solutions containing at least one of metal salt or oxide. Examples of the preferable metal are iron, copper, zinc, manganese, chromium, sodium, potassium, aluminum, and the like. Examples of the preferable salt are phosphate, carbonate, nitrate, silicofluoride, fluoride, chromate, and the like.

The metal surface treated with the said chemically metallizing liquid (usually, its concentration is about 5 to 400 g./liter) is usually dried at a temperature of about 10° to about 100°C. and for a period of several minutes to about 20 minutes to form a chemically metallizing layer. The thickness of the chemically metallizing layer varies according to a kind of metal salt or metal compound in the chemically metallizing liquid, usually about 0.5 to about 50 $\mu$, particularly about 1 to about 30 $\mu$.

On the chemically metallizing layer thus obtained polyfluorocarbon coating composition is further coated according to a conventional means, dried and then sintered to form a desired polyfluorocarbon film having chemically metallizing layer on one side of the metal surface.

Sintering temperature may be selected from the range of about 280° to about 420°C., particularly about 300° to about 390°C. In case the sintering temperature is higher than 420°C., it tends to cause decomposition or coloration of the polymer. In case it is lower than 280°C., the film is peeled off with difficulty from the metal surface, the desired polyfluorocarbon film is not obtained, the sintering is not enough, and the mechanical strength of the polyfluorocarbon film is decreased.

Sintering time varies according to the sintering temperature, and usually may be selected from the range of about 5 minutes to about 3 hours. If necessary, the sintering may be carried out under an elevated pressure. Furthermore, according to the present method, there may be obtained any product having various thicknesses, e.g. a thin film of 5 $\mu$ to, if desired, a thick sheet.

The polyfluorocarbon film, having a chemically metallizing layer on one side, formed on a metal surface as described above can be readily peeled off, in the state of tightly bonding the chemically metallizing layer, from the metal surface by hand. If the peeling from the metal surface is difficult, the peeling can be attained by the treatment with hot water.

In case the coloration to the desired polyfluorocarbon film is required, a colorant such as pigment or dyestuff is previously added into the polyfluorocarbon coating composition. For improving the coefficient of friction, a filler such as glass powder, glass wool or metal powder may be used. If necessary, the surface of polyfluorocarbon film on the side without any metallizing layer may be coated with a finishing agent.

Thus obtained polyfluorocarbon film can be readily adhered against various self-supporting materials, e.g. metal, glass, earthen ware, wood, rubber, plastic, fiber, paper, and the like by using conventional adhesives, because of the presence of the chemically metallizing layer.

As an adhesive there may be optionally employed a natural or synthetic one according to a variety of a self-supporting material to be adhered. Suitable examples of the adhesive are epoxy resin, amino-plast, phenolic resin, polyester, polyamide, polyisocyanate, polyvinyl alcohol, polyvinyl butyral, acrylic resin, polyvinyl acetate, synthetic rubber, shellac, and the like.

The method for making the above-mentioned polyfluorocarbon film can also be performed in a continuous manner. For example, such a continuous system is carried out by using the following apparatus which comprises a flexible endless, metallic thin plate 11 which can be continuously run by a driving roll, a treating zone 12 for making a chemically metallizing layer 13 onto a metal surface, a washing zone 14 for the chemically metallizing layer, a drying zone 15 for the layer 16 after washing, a coating zone 17 for a polyfluorocarbon coating composition onto the formed chemically metallizing layer 18, a drying zone 19 for the coating layer 20 of the polyfluorocarbon coating composition, a sintering zone 21 for sintering at about 280° to about 420°C. the film 22 after drying, a cooling zone 23 for the sintered film, and a peeling zone 24 for mechanically peeling off the polyfluorocarbon film 25 having the formed chemically metallizing layer 18 from the metallic thin plate 11, the said endless metallic thin plate being continuously run through all of the said zones in one round.

Figure 3:
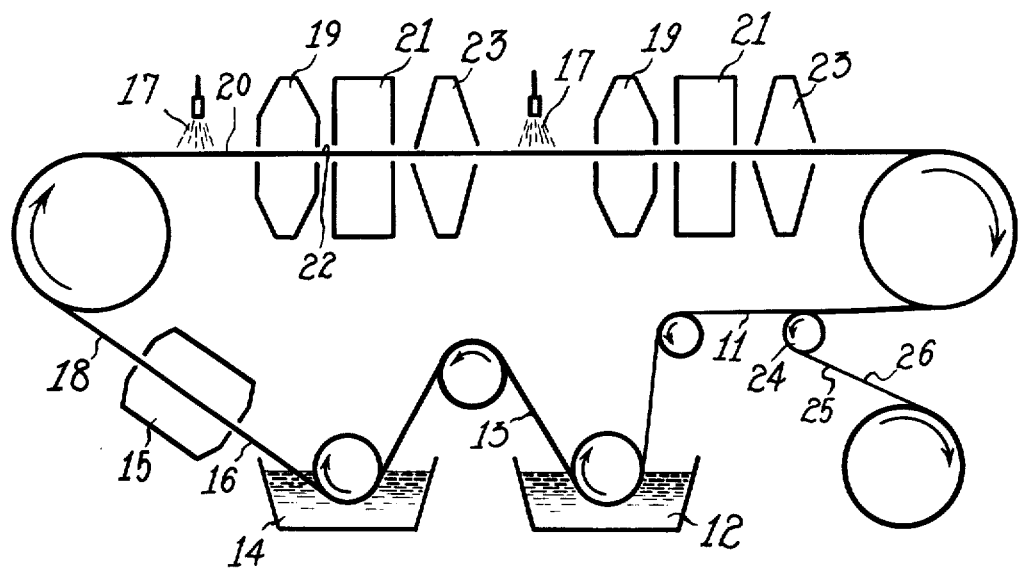
FIG. 3 is a diagram for illustrating the apparatus for manufacturing polyfluorocarbon film of the present invention.
Figure 4:
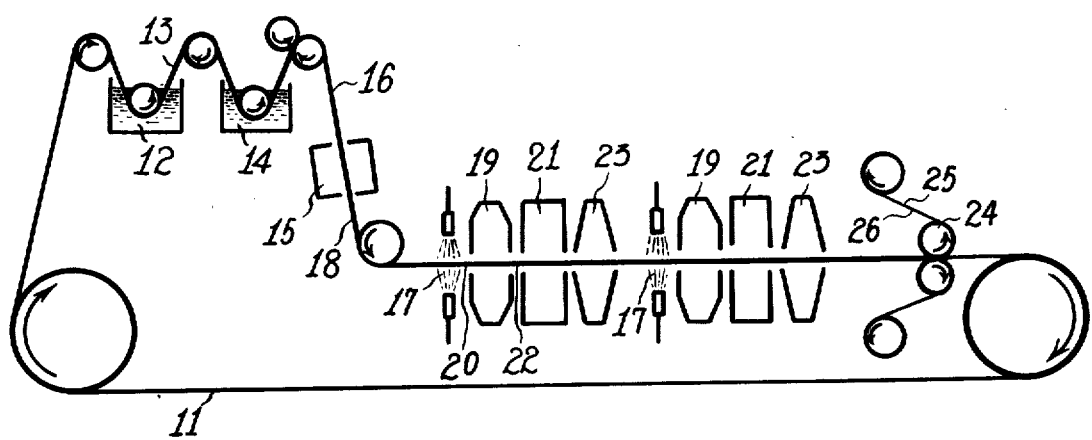
FIG. 4 is a diagram for illustrating the other embodiment of apparatus for manufacturing the polyfluorocarbon film.

The metallic thin plate 11 is, if necessary, run through a degreasing zone (not shown in drawings) prior to entering to the treating zone 12. The degreasing treatment may be carried out by, for example, dipping the metallic thin plate 11 in an aqueous solution of "Parcocleaner-N 365" (concentration: 20 g./liter), made by Nihon Parkerizing Co., Ltd., at 40° to 60°C. for several minutes, taking out and then washing with water. The treating zone 12 shown in FIG. 3 and FIG. 4 is a system of dipping vessel, further may be a system of spray coating or brushing coating. A suitable concentration of the chemically metallizing liquid is usually about 5 to about 400 g./liter.

Thus formed chemically metallizing layer 13 is washed with water in the washing zone 14. The washing zone 14 shown in FIG. 3 and FIG. 4 is a system of dipping vessel, further may be a system of passing through water stream. The chemically metallizing layer 16 after washing is introduced into the drying zone 15 to remove off water. Prior to introducing into the drying zone 15, the said layer 16 may be passed through a water-removing zone such as roll. As the drying zone 15 there is optionally employed a heating system by the use of nichrome wire, infrared ray, hot air, or the like.

Thus formed chemically metallizing layer 18 is coated with a polyfluorocarbon coating composition by using the coating zone 17. A system of spray as shown in FIG. 3 and FIG. 4 is used as coating zone 17. A system of roll coating, brush coating, and the like may also be used. The formed coating layer 20 from polyfluorocarbon coating composition is dried by using the drying zone 19. As the drying zone 19 there may be employed a heating system by the use of nichrome wire, infrared ray, hot air, or the like. The film 22 after drying is sintered in the sintering zone 21 at 280° to 420°C., particularly 300° to 390°C. As the sintering zone 21 there are usually employed electrical furnace and gas furnace.

After sintering, the sintered film is cooled by the cooling zone (usually, air-cooling) 23 to form the polyfluorocarbon film 25 having the chemically metallizing layer 18 on one side.

A series of the above-mentioned steps, i.e. coating of polyfluorocarbon coating composition, drying, sintering and cooling, if necessary, can be repeated two times or more.

The polyfluorocarbon film 25 having the chemically metallizing layer 18, after cooling, is successively peeled off mechanically from the metallic thin plate 11 at the position of a guide roll 26 and then wound up onto a winding roll 27. In that case, the said guide roll functions as a peeling zone.

On the other hand, after peeling off the metallic thin plate 11, the polyfluorocarbon film 25 is subjected to the degreasing treatment again and then introduced into the treating zone 12 for making the chemically metallizing layer.

In FIG. 4, there is shown another embodiment of the apparatus by which the polyfluorocarbon films can be formed on both surfaces of the metallic thin plate 11. By this apparatus, two sheets of the polyfluorocarbon film can be produced at the same time in the same manner as in FIG. 3, and therefore it is much effective.

The present invention is illustrated in detail by the following examples.

EXAMPLE 1

An iron plate (300 × 300 inches) having a thickness of 1.5 mm. was degreased. The degreasing was carried out by dipping the iron plate into a 20 g./liter aqueous solution of Parco-cleaner-N 365, made by Nihon Parkerizing Co., Ltd., at 40° to 60°C. for 7 minutes, taking out and then washing with water.

The iron plate after the degreasing treatment was subjected to the chemical metallization.

The chemical metallization was carried out by dipping the iron plate in a 70 g./liter aqueous solution of BONDERITE L-47 (containing zinc carbonate, phosphoric acid and nitrate as a main component), made by Nihon Parkerizing Co., Ltd., at 50° to 60°C. for 25 minutes to form a chemically metallizing layer of zinc phosphate ($Zn_3(PO_4)_2 \cdot xH_2O$) on the iron plate, washing with water and then drying. The chemically metallizing layer had a thickness of about 10 μ. The layer was spray coated with POLYFLON enamel EK-1108GY (trade name of polytetrafluoroethylene primer, made by Daikin Kogyo Co., Ltd.) so as to be a thickness of 10 to 15 μ, dried for 30 minutes by using an infrared drier, sintered at 380°C. for about 10 minutes in an electric furnace, taken out of the furnace and then cooled. Furthermore, there was spray-coated thereon with POLYFLON enamel EK-4108GY (trade name of polytetrafluoroethylene enamel, made by Daikin Kogyo Co., Ltd.) so as to be a thickness of 15 to 20 μ, air-dried till finger-drying, completely dried for about 20 minutes by the infrared drier, sintered at 380°C. for about 15 minutes in the electric furnace, taken out of the furnace and then cooled. And then, the resultant film was gently peeled off by hand from the edge to give a polytetrafluoroethylene film (300 × 300 inches) having a chemically metallizing layer on one side.

Thus obtained polytetrafluoroethylene film was cut in a form of long strip of 10 × 100 mm. A length of 50 mm. on the metallizing layer side was adhered to a wood piece by using ARALDITE PZ-985E (trade name of epoxy resin adhesive, made by Ciba Ltd.), and then the adhering test of the obtained test piece was carried out in a condition of a tensile velocity of 5 cm./minute by a tensile tester (Shimazu UM-3). As a result, the film itself was broken without any peeling even under a load of 0.4 kg./cm.

As Controls, the following three kinds of experiments were carried out. That is, the procedure of Example 1 was repeated except that iron plate, copper plate or aluminum plate was employed, respectively, and the formation of a chemically metallizing layer was omitted, to give three kinds of polytetrafluoroethylene film having a thickness of 30 to 42 μ.

In every cases, the peeling from the metal plate was impossible, and the polyfluorocarbon films could not be taken out.

EXAMPLES 2 to 7

The procedure of Example 1 was repeated. Various polyfluorocarbon films were produced in the same manner as described in Example 1 except that kinds of metal plate, chemically metallizing layer and polyfluorocarbon coating composition were varied.

The test results of peeling and adhering of the obtained films were shown in the following Table.

| | Example No. | 2 | 3 | 4 | 5 | 6 | 7 |
|---|---|---|---|---|---|---|---|
| | Kind of metal plate | Iron | Copper | Aluminum | Aluminum | Iron | Copper |
| | Metallizing liquid | BONDERITE L-47 | BRASSBOND A (Main component: copper compd., nitrate) | ALBOND A (Main component: silico-fluoride) | BONDERITE 723 (Main component: chromic acid, fluoride) | PARCOLUBRITE A (Main component: manganese carbonate, iron carbonate, phosphric acid) | BRASSBOND B (Main component: chromic acid, mineral acid) |
| Chemically metallization | Conc. of metallizing liquid (g./liter) | 70 | 30 | 30 | 83.3 | 140 | 330 |
| | Temperature (°C.) | 50–60 | 100 | 98 | 26–49 | 96–99 | 104 |
| | Period (min.) | 5 | 10 | 15 | 20 | 15 | 5 |
| | Means | Dipping | Dipping | Dipping | Dipping | Dipping | Dipping |
| | Component of metallizing | $Zn_3(PO_4)_2 \cdot xH_2O$ | $Cu_2O$ | $Al.ZnF\text{-}SiO_2$ | $xAl_2O_3 \cdot yCr_2O_3$ | $Mn_3(PO_4)_2 \cdot 4H_2O$ | $Cu_2O$ |

-continued

| | | | | | | | |
|---|---|---|---|---|---|---|---|
| | layer | | | zCr$_2$O$_3$ | | | |
| Formation of polyfluorocarbon film | Primer (Sintering condition) | POLYFLON enamel EK-1108GY (380°C., 10 min.) | — | POLYFLON enamel EK-1108GY (380°C., 10 min.) | POLYFLON enamel EK-1108GY (380°C., 10 min.) | POLYFLON enamel EK-1108GY (380°C., 10 min.) | POLYFLON enamel EK-1108GY (380°C., 10 min.) |
| | Enamel (Sintering condition) | NEOFLON dispersion ND-2 (TFE-HFP copolymer enamel) (330°C., 90 min.) | POLYFLON enamel EK-2205GN (one coat PTFE enamel) (380°C., 15 min.) | POLYFLON enamel EK-4108GY (PTFE enamel) (380°C., 15 min.) | POLYFLON enamel EK-4108GY (PTFE enamel) (380°C., 15 min.) | POLYFLON enamel EK-4108GY (PTFE enamel) (380°C., 15 min.) | POLYFLON enamel EK-4108GY (PTFE enamel) (380°C., 15 min.) |
| | Means | Spray | Spray | Spray | Spray | Spray | Spray |
| | Thickness of film | 72–75 | 38–42 | 70–72 | 50–55 | 36–40 | 40 |
| Peeling from metal plate | No treatment | Easy | Easy | Not easy | Easy | Not easy | Not easy |
| | After hot water treatment | Easy | Easy | Easy | Easy | Easy | Easy |
| Adhering test | Adhesive | BOND (made by Konishi Gisuke Shoten) | CEMEDINE A-B (made by Cemedine Co., Ltd.) | CEMEDINE A-B (made by Cemedine Co., Ltd.) | BOND | BOND | BOND |
| | Tensile strength (kg./cm.) | 1.0 | 0.5 | 0.5 | 0.5 | 0.5 | 0.5 |
| | Result | Broken | Broken | Broken | Broken | Broken | Broken |

(NOTE) 1. As a chemically metallizing liquid there were employed those made by Nihon Parkerizing Co., Ltd.

2. As a polyfluorocarbon primer and enamel there were employed those made by Daikin Kogyo Co., Ltd.

3. TFE: tetrafluoroethylene, PTFE: polytetrafluoroethylene, HFP: hexafluoropropylene 4. Peeling test after hot water treatment was carried out by dipping a test piece in boiling water for 1 hour, taking out, drying and then peeling by hand.

EXAMPLE 8

A chemically metallizing film was made on one side of iron plate by treating with BONDERITE-144 (trade name of chemically metallizing liquid, made by Nihon Parkerizing Co., Ltd.) according to a conventional procedure, and POLYFLON enamel EK-1108GY primer was coated thereon, dried and sintered at 380°C. for 10 minutes. And further, the resultant layer was coated with POLYFLON dispersion D-1 (trade name of polytetrafluoroethylene dispersion, made by Daikin Kogyo Co., Ltd.) by a roll coater so as to be a thickness of 10 μ, dried, sintered at 360°C. for 20 minutes and then peeled off from the iron plate. The peeling was readily attained.

The chemically metallizing side of thus obtained polyfluorocarbon film was adhered onto a wood piece with BOND, and then the adhering test was carried out. As a result, the film was broken out under a road of 0.2 kg/cm.

What we claim is:

1. A sintered polyfluorocarbon film or sheet having a chemically metallizing layer on one side in order to improve the adhesiveness of said film or sheet
   wherein said polyfluorocarbon is selected from the group consisting of polytetrafluoroethylene and a copolymer of tetrafluoroethylene and hexafluoropropylene and
   said chemically metallizing layer comprising a water-insoluble crystalline metal salt or oxide of a metal selected from the group consisting of iron, copper, zinc, manganese, chromium, sodium, potassium, and aluminum, wherein said film or sheet consists essentially of said polyfluorocarbon and said chemically metallizing layer.

2. The sintered polyfluorocarbon film or sheet of claim 1, wherein said chemically metallizing layer is selected from the group consisting of zinc phosphate, zinc fluoride, aluminum fluoride, manganese phosphate, copper oxide, aluminum oxide and chromium oxide.

3. The sintered polyfluorocarbon film or sheet of claim 1 having a thickness of from 5 to 100 μ.

* * * * *